United States Patent [19]

Tokumitsu

[11] Patent Number: 4,791,306
[45] Date of Patent: Dec. 13, 1988

[54] METHOD AND APPARATUS FOR CONVERTING IMAGE INTO ELECTRICAL SIGNALS

[75] Inventor: Jun Tokumitsu, Sagamihara, Japan

[73] Assignee: Canon Kabushiki Kaisha, Tokyo, Japan

[21] Appl. No.: 139,138

[22] Filed: Dec. 23, 1987

Related U.S. Application Data

[63] Continuation of Ser. No. 914,151, Oct. 1, 1986, abandoned.

[30] Foreign Application Priority Data

Oct. 4, 1985 [JP] Japan .................................. 60-220291

[51] Int. Cl.⁴ ................................................ G02F 1/29
[52] U.S. Cl. ..................................... 250/578; 358/166;
  358/213.15; 358/213.27
[58] Field of Search ................ 250/578; 358/111, 166,
  358/213.28, 213.29, 215.15; 378/99

[56] References Cited

U.S. PATENT DOCUMENTS

| | | | |
|---|---|---|---|
| 4,053,773 | 10/1977 | Deresh et al. | 250/578 |
| 4,446,484 | 5/1984 | Powell | 358/166 |
| 4,447,827 | 5/1984 | Alexandrescu et al. | 358/111 |
| 4,543,601 | 9/1985 | Harada et al. | 250/578 |
| 4,618,928 | 10/1986 | Honda et al. | 358/111 |

*Primary Examiner*—Edward P. Westin
*Assistant Examiner*—Charles F. Wieland
*Attorney, Agent, or Firm*—Fitzpatrick, Cella, Harper & Scinto

[57] ABSTRACT

According to a method and apparatus for converting an image into electrical signals, a single image is exposed onto a plurality of solid-state image pickup devices a plurality of times each, and charges distributed in correspondence with images induced by the respective exposure cycles are shifted within the respective solid-state image pickup devices and are added to each other. In addition, the output signals generated by the solid-state image pickup devices and representing the identical pixels are subtracted from each other.

34 Claims, 4 Drawing Sheets

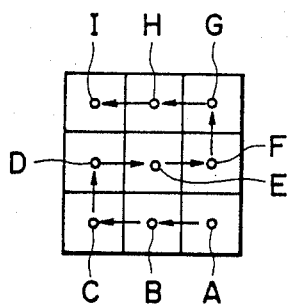
FIG. 2  FIG. 3  FIG. 4(a)  FIG. 4(b)
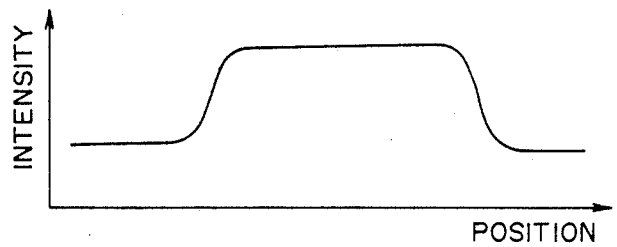
FIG. 5
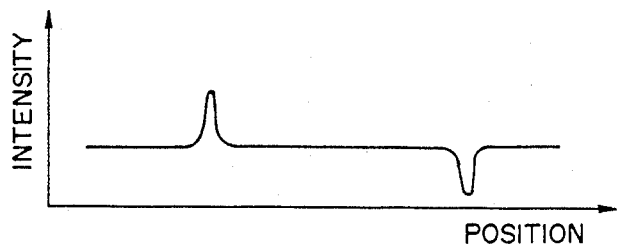
FIG. 6(a)
FIG. 6(b)

|   |    |   |
|---|----|---|
| 0 | -1 | 0 |
| -1 | 5 | -1 |
| 0 | -1 | 0 |
FIG. 7
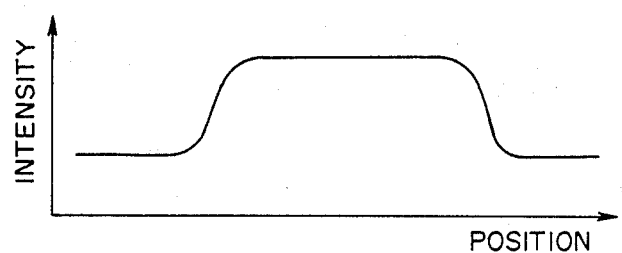
FIG. 8(a)
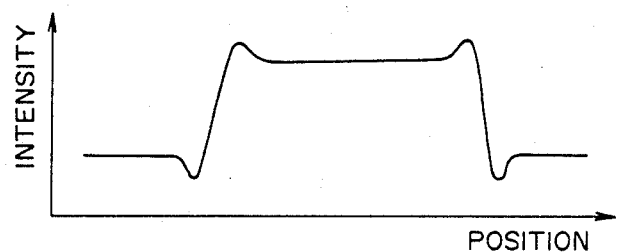
FIG. 8(b)

METHOD AND APPARATUS FOR CONVERTING IMAGE INTO ELECTRICAL SIGNALS

This application is a continuation of application Ser. No. 914,151, filed 10,1,1986 now abandoned.

BACKGROUND OF THE INVENTION

1. Field of the Invention

The present invention relates to a method and apparatus for converting an image into filtered electrical signals.

2. Related Background Art

Various demands are present in the field of image processing. Especially, filtering for removing noise or the like from image signals is important as basic processing. Filtering is performed, e.g., in the following manner. When an image is divided into pixel (picture element) arrays and the pixels are then read, a read value of a given pixel is calculated as a weighted average of a plurality of adjacent pixels including the given pixel. In such filtering, an output signal from an image sensor is processed (i.e., repeated multiplications and additions) by software using a computer or special hardware. For this reason, when the number of pixels to be processed is large, the processing time is prolonged, or an expensive operational/processing unit must be used to increase the processing speed.

SUMMARY OF THE INVENTION

It is an object of the present invention to provide a method and apparatus for converting an image into filtered electrical signals by arithmetic operations including subtractions in a short period of time.

In order to achieve the above object of the present invention, a single image is exposed onto a plurality of solid-state image pickup devices a plurality of times each, charges distributed in correspondence with images induced by the respective exposure cycles are shifted within the respective solid-state image pickup devices and are added to each other. The output signals generated by the solid-state image pickup devices and representing the identical pixels are subtracted from each other.

BRIEF DESCRIPTION OF THE DRAWINGS

FIG. 2 is an enlarged plan view showing part of an image input to the image processing apparatus in FIG. 1;

FIG. 3 is a table showing weighting coefficients in an arithmetic operation in the apparatus of FIG. 1;

FIGS. 4(a) and 4(b) are tables showing the weighting distributions of luminous intensity of the light source so as to achieve the arithmetic operation in FIG. 3;

FIG. 5 is a table showing an order of image shifting when the arithmetic operation in FIG. 3 is performed;

FIGS. 6(a) and 6(b) are respectively graphs showing the intensity distributions of the input and output images in the arithmetic operation of FIG. 3;

FIG. 7 is a table showing weighting coefficients for another arithmetic operation;

FIGS. 8(a) and 8(b) are respectively graphs showing the intensity distributions of the input and output images in the arithmetic operation of FIG. 7;

DETAILED DESCRIPTION OF THE PREFERRED EMBODIMENTS

Preferred embodiments of the present invention will be described with reference to the accompanying drawings.

Figure 1:
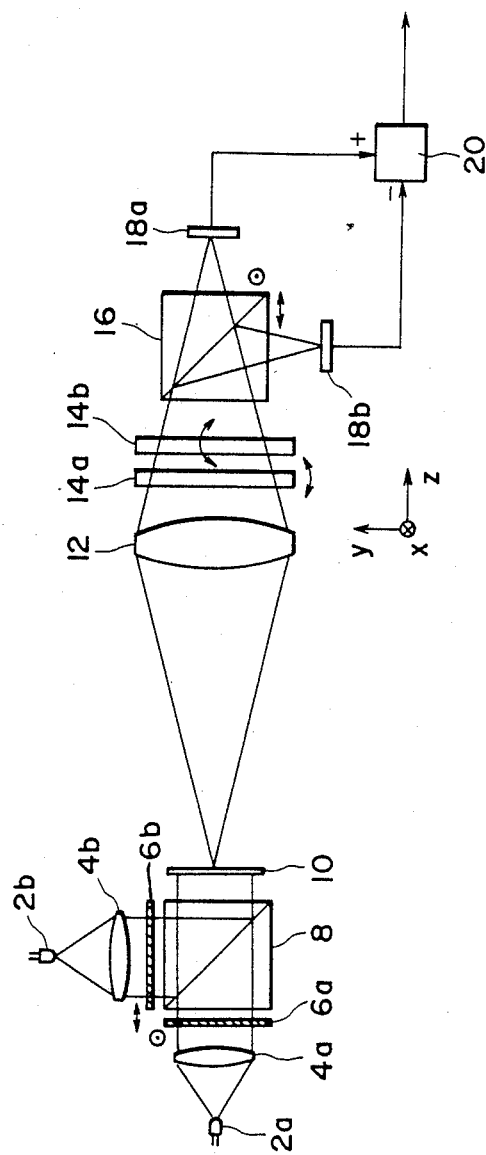
FIG. 1 is a schematic view of an image processing apparatus according to a first embodiment of the present invention.

FIG. 1 schematically shows a first embodiment of the present invention.

Referring to FIG. 1, light sources 2a and 2b comprise LEDs, respectively. Collimator lenses 4a and 4b are perpendicular to each other and arranged to collimate beams from the light sources 2a and 2b. Polarizing plates 6a and 6b are perpendicular to each other and are respectively parallel to the collimator lenses 4a and 4b so as to receive beams from the collimator lenses 4a and 4b. The polarizing plate 6a transmits the component of light having a polarization direction perpendicular to the surface of FIG. 1. The polarizing plate 6b transmits the component of light having a polarization direction parallel to the surface of FIG. 1. A polarizing beam splitter 8 is arranged such that two input sides thereof are respectively parallel to output surfaces of the polarizing plates 6a and 6b. An image film 10 is disposed at the output surface of the polarizing beam splitter 8 and is parallel thereto. A focusing lens 12 is aligned along the optical axis of the collimator lens 4a so as to receive a beam from the image film 10. Transparent parallel flat plates 14a and 14b are disposed at the output side of the focusing lens 12. The flat plates 14a and 14b are made of glass or plastic. The flat plate 14a can be rotated about a rotating shaft by a drive mechanism (not shown) in a direction (i.e., the x direction in FIG. 1) perpendicular to the surface of FIG. 1. The flat plate 14b can be rotated about a rotating shaft in a direction (the y direction in FIG. 1) parallel to the surface of FIG. 1 and perpendicular to the optical axis of the focusing lens 12. A polarizing beam splitter 16 is arranged at the output side of the flat plate 14b. Image sensors 18a and 18b comprise solid-state image pickup devices, respectively, and are located to receive beams from the polarizing beam splitter 16. Each image sensor has many light-receiving elements arranged in a matrix form. The image sensor is exemplified by a charge coupled device (CCD) or a MOS image sensor. A subtracter 20 is arranged to receive electrical signals from the image sensors 18a and 18b and subtracts the electrical signal from the image sensor 18b from the electrical signal from the image sensor 18a. A different signal is thus output from the subtracter 20.

According to the arrangement shown in FIG. 1, the image is filtered. The principle of image filtering will be briefly described below. FIG. 2 is an enlarged plan view showing part of the image film 10. Pixels $X_1$ to $X_9$ represent pixels and their luminance levels of the image film 10 since the pixel range for weighted average is given as 9 = (3 row pixels) × (3 column pixels). A filtered output $Y_5$ of the pixel $X_5$ is given as follows:

$$Y_5 = 1/9 \sum_{i=1}^{9} a_i x_i \qquad (1)$$

where $a_1$ is the weighting coefficient of each pixel. Filtered outputs of other pixels can be obtained in the same manner as described above.

Referring to FIG. 1, a beam from the LED 2a is collimated by the collimator lens 4a, and the collimated beam passes through the polarizing plate 6a and is converted into a linearly polarized beam along the x direction. Meanwhile, a beam from the LED 2b is collimated by the collimator lens 4b, and the collimated beam passes through the polarizing plate 6b and is converted into a linearly polarized beam along the z direction. The polarizing beam splitter 8 has optical characteristics wherein the linearly polarized beam perpendicular to the surface of FIG. 1 is transmitted therethrough, and the linearly polarized beam parallel to the surface of FIG. 1 is reflected thereby. Two parallel beams incident from the polarizing plates 6a and 6b onto the beam splitter 8 are combined to uniformly illuminate the input image film 10. The beam from the input image film 10 is focused by the focusing lens 12 and passes through the parallel flat plates 14a and 14b. The beam from the flat plates 14a and 14b is incident on the polarizing beam splitter 16. The beam splitter 16 has the same optical characteristics as those of the beam splitter 8. The linearly polarized beam perpendicular to the surface of FIG. 1 passes through the beam splitter 16 and is incident on the image sensor 18a. The linearly polarized beam parallel to the surface of FIG. 1 is reflected by the beam splitter 16 and is incident on the image sensor 18b. The image of the input image film 10 illuminated by the LED 2a is focused on the image sensor 18a. The image of the input image film 10 illuminated by the LED 2b is focused on the image sensor 18b. By rotating the parallel flat plates 14a and 14b about their rotating shafts, the images focused on the image sensors 18a and 18b are two-dimensionally shifted. If the flat plate 14a is rotated about the rotating shaft in the x direction through a desired angle, the images on the image sensors 18a and 18b are shifted in the y and z directions, respectively. If the flat plate 14b is rotated about the rotating shaft in the y direction through a desired angle, the images on the image sensors 18a and 18b are shifted in the x direction. Image shifting operations along the two directions are independently performed.

The weighting coefficient $a_i$ in equation (1) for filtering is given as a specific value by the luminous intensities of the LEDs 2a and 2b. A positive value of the coefficient $a_i$ is given by the LED 2a and a negative value of the coefficient $a_i$ is given by the LED 2b. The LED 2a emits light at an intensity corresponding to the positive value of the coefficient. The LED 2b emits light at an intensity corresponding to the negative value of the coefficient.

Filtering is performed as follows. The parallel flat plates 14a and 14b are rotated to project of an image of the image film 10 as superposed images on the image sensors 18a and 18b. In this case, the intensities of beams from the LEDs 2a and 2b are changed according to the predetermined processing pattern, and electrical output signals from the image sensors 18a and 18b are subtracted by the subtracter 20. The arithmetic operation in the subtractor 20 is performed in units of the light-receiving elements of the image sensor which correspond to the pixels of the image formed on each image sensor 18a or 18b. Since the image on the image sensor 18b is obtained by reflection by the beam splitter 16, it is inverted from the image formed on the image sensor 18a. Therefore, the output orders of the image sensors 18a and 18b are opposite.

Filtering will be described in more detail.

FIG. 3 is a view showing the weighting coefficients when an arithmetic operation for obtaining row differential coefficients in the range of 9 pixels=(3 column pixels)×(3 row pixels). In order to perform differential operation, the weighting coefficients in FIG. 4(a) are provided by the LED 2a, and the weighting coefficients in FIG. 4(b) are provided by the LED 2b. The positive values of the coefficients of FIG. 3 are given without modifications, and other values are set to be zero in FIG. 4(a). The negative values of the coefficients of FIG. 3 are given as absolute values and other values are set to be zero in FIG. 4(b).

FIG. 5 shows an order of image shifting when differential operation within the nine pixels is performed. Image shifting is performed in units of pixels (the "pixel" here means an image portion focused on each light-receiving element of the image sensor). The image portion is sequentially shifted by two pixels to the left, by one pixel upward, two pixels to the right, one pixel upward, and two pixels to the left. Image exposure is performed for a predetermined period of time prior to image shifting Upon completion of image shifting, exposure for a predetermined period of time is performed. The lower right pixel in the image first focused on the image sensor 18a is sequentially shifted in an order from A to I. The shifting order of the image sensor 18b is opposite that of the image sensor 18a.

Only the LED 2a is turned on at timings corresponding to positions A, F, and G at an intensity corresponding to weight "1", and only the LED 2b is turned on at timings corresponding to positions C, D, and I at an intensity corresponding to weight "1". However, neither the LEDs 2a nor 2b are turned on at timings corresponding to positions B, E, and H.

By multiple exposure upon image shifting, the charges generated by the pixels corresponding to the positive weighting coefficients are sequentially stored in the image sensor 18a. The charges generated by the pixels corresponding to the negative weighting coefficients are sequentially stored in the image sensor 18b. The outputs from the image sensors 18a and 18b are subtracted by the subtractor 20. The row differential coefficients with respect to the central pixel position are obtained as the result of differential operation using the pattern of FIG. 3.

An arithmetic operation for calculating the column differential coefficients can be performed using coefficients similar to the weighting coefficients of FIG. 3.

FIGS. 6(a) and 6(b) are graphs showing intensity distributions when the differential operation is performed for all pixels. More specifically, FIG. 6(a) shows the intensity distribution of the input image, and FIG. 6(b) shows the intensity distribution of the output image. For illustrative convenience, these graphs are plotted using one-dimensional data. As is apparent from FIGS. 6(a) and 6(b), edge extraction of the image is performed.

According to this embodiment, by properly changing the weighting coefficient for filtering, various types of processing can be performed.

FIG. 7 shows weighting coefficients for performing edge emphasis. By using these weighting coefficients, edge data extracted by Laplacian transform can be added to the input image so as to emphasize the edge of the image.

FIGS. 8(a) and 8(b) show intensity distributions when edge emphasis of FIG. 7 is performed for all pixels. More specifically, FIG. 8(a) shows the intensity distribution of the input image, and FIG. 8(b) shows the intensity distribution of the output image. For illustrative convenience, these graphs are plotted using one-dimensional data. As is apparent from the intensity distribution of the processed, i.e., output image, the edge of the image is emphasized, and the visibility of the image can be improved since its edge is very sharp.

Figure 9:
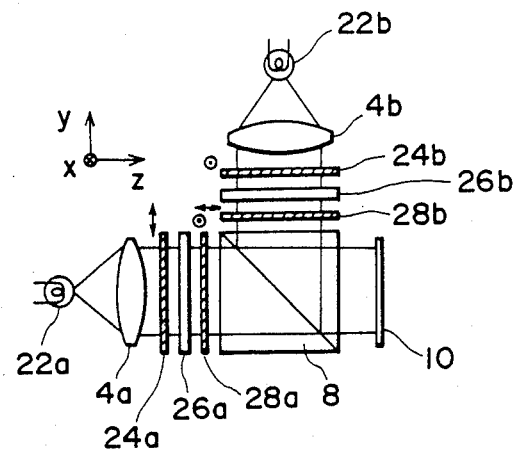
FIG. 9 is a schematic diagram showing part of an illumination system of an image processing apparatus according to a second embodiment of the present invention.

FIG. 9 is a schematic view showing an illumination system according to a second embodiment of the present invention. The same reference numerals as in FIG. 1 denote the same parts in FIG. 9, and a detailed description thereof will be omitted.

White light sources 22a and 22b for emitting light having a predetermined intensity are used as light sources. A polarizer 24a an electrooptical element 26a, and an analyzer 28a are arranged between a collimator lens 4a and a polarizing beam splitter 8. Similarly, a polarizer 24b, an electrooptical element 26b, and an analyzer 28b are arranged between a collimator lens 4b and the polarizing beam splitter 8. The electrooptical elements 26a and 26b are exemplified by ones using an electrooptical material such as PLZT, $LiNbO_3$, KDP, and ADP.

A beam from the light source 22a is collimated by the collimator lens 4a, and the collimated beam is converted by the polarizer 24a into a linearly polarized beam in the y direction. This linearly polarized beam is incident on the electrooptical element 26a and is polarized into an elliptically polarized beam according to an elliptic function determined by the voltage applied to the element 26a. The elliptically polarized beam is output from the element 26a and is incident on the analyzer 28a. The analyzer 28a transmits only the linearly polarized component along the x direction. Similarly, a beam from the light source 22b is collimated by the collimator lens 4b, and the collimated beam is polarized by the polarizer 24b into a linearly polarized beam along the x direction. This linearly polarized beam is incident on the electrooptical element 26b and is converted into an elliptically polarized beam. This beam is output from the element 26b and incident on the analyzer 28b. The analyzer 28b then transmits only the linearly polarized beam along the z direction.

The two parallel beams incident from the analyzers 28a and 28b to the polarizing beam splitter 8 are combined in the same manner as in the first embodiment to uniformly illuminate the image film 10. In the second embodiment, the focusing system components after the input image film 10 and the signal processing system are the same as those in the first embodiment.

In the second embodiment, the weighting coefficient $a_i$ for filtering in equation (1) is controlled by voltages applied to the electrooptical elements 26a and 26b. More specifically, the voltage applied to the electrooptical element 26a is determined such that a beam having an intensity corresponding to a positive value of the weighting coefficients $a_i$ is output from the analyzer 28a. The voltage applied to the electrooptical element 26b is determined such that a beam having an intensity corresponding to the absolute value of a negative weight coefficient $a_i$ is output from the analyzer 28b.

In this embodiment, filtering can be performed in the same manner as in the first embodiment, except for the weighting coefficients $a_i$.

According to the second embodiment, since the illumination light is white light, a color input image can be filtered.

In the above embodiment, two parallel flat plates are rotated as means for shifting the images on the image sensors. However, any other means such as two rotatable reflecting mirrors and two variable convex angle prisms may be used.

According to the present invention, without shifting the image itself formed on the image sensor, the image shift effect may be achieved by charge transfer between the light-receiving elements of the image sensor.

Figure 10:
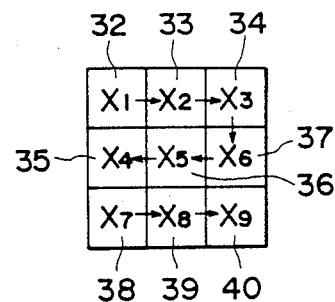
FIG. 10 is a table showing an order of image shifting by charge transfer according to the present invention.

FIG. 10 is a view for explaining such image shifting. Referring to FIG. 10, an image sensor has light-receiving elements 32, 33, 34, 35, 36, 37, 38, 39, and 40. The pixels $X_1$ to $X_9$ are always focused on these elements. The charge transfer in the image sensor is performed as indicated by the arrows in FIG. 10. Each transfer is performed by one light-receiving element for each exposure cycle. The input image is illustrated at an intensity corresponding to the weighting coefficient al during the first exposure cycle. In the second exposure cycle, the input image is illuminated at an intensity corresponding to the weight coefficient $a_2$. Similarly, the input image is illuminated at the intensities corresponding to the predetermined weighting coefficients for the respective exposure cycles. After nine exposure cycles and eight charge transfer cycles are completed, the charges calculated by $$\sum_{i=1}^{9} a_i x_i$$

are stored in the light-receiving element 40. In other words, the filtered output given by equation (1) is obtained.

An image is formed on one of the two identical image sensors according to the positive or negative value of the weighting coefficient $a_i$. The outputs from the image sensors are subtracted by the subtracter in the same manner as in the first and second embodiments.

According to this method, the means for shifting the images focused on the image sensors can be omitted.

In the above embodiment, double exposure is performed by polarization according to the different signs of the weighting coefficients for filtering. However, if color information is not important, double exposure may be performed according to wavelengths of light. In this case, two light sources such as LEDs having different wavelengths of light beams emitted therefrom are used. A dichroic mirror is used in place of the polarizing beam splitter to combine the beams having different wavelengths into a single light component or separate the single light component into beams having different wavelengths.

According to the present invention described above, most of the arithmetic operations are performed on the solid-state image pickup device, and parallel processing is performed for all pixels. Even if the number of pixels is increased, the processing time is not greatly inclased. An image having a large number of pixels can be processed with a simple arrangement at a high speed.

According to the present invention, processed signals are obtained by subtracting the outputs from a plurality of solid-state image pickup devices. Therefore, arithmetic operations can be performed even if negative weighting coefficients are included. For example, important operations such as edge extraction and edge emphasis can be performed. The present invention is used in a variety of applications.

What is claimed is:

1. A method of converting an image into electrical signals, comprising the steps of:
    exposing a single image on a plurality of solid-state image pickup devices a plurality of times each;
    shifting charges induced by exposure cycles and distributed in correspondence with the single image in said solid-state image pickup devices while exposure is performed, and adding shifted charges; and
    performing a subtraction of output signals from said solid-state image pickup devices, the output signals representing corresponding pixels of said plurality of solid-state image pickup devices.

2. A method according to claim 1, wherein the image is exposed while being moved with respect to said solid-state image devices.

3. A method according to claim 2, wherein each exposure is performed with an amount of light corresponding to a weighting coefficient of each pixel when the image is filtered.

4. A method according to claim 2, wherein said solid-state image devices have light-receiving sections which are two-dimensionally arranged, and the image is exposed while being moved two-dimensionally with respect to said solid-state image devices.

5. A method according to claim 1, wherein the charges are transferred in said solid-state image devices during each exposure.

6. A method according to claim 5, wherein each exposure is performed with an amount of light proportional to a weighting coefficient of each pixel when the image is filtered.

7. A method according to claim 5, wherein said solid-state image devices have light-receiving sections which are two-dimensionally arranged, and the charges are transferred two-dimensionally.

8. An apparatus for converting an image into electrical signals, comprising:
    a plurality of solid-state image pickup devices;
    exposing means for exposing a single image on said solid-state image pickup devices a plurality of times each; and
    means for performing a subtraction between output signals from said solid-state image pickup devices, the output signals representing corresponding pixels of said plurality of solid-state image pickup devices.

9. An apparatus according to claim 8, wherein said exposing means includes image shifting means for changing a relative position between an exposed image and said plurality of solid-state image pickup devices while the image is exposed the plurality of times.

10. An apparatus according to claim 9, wherein said image shifting means comprises transparent parallel flat plates arranged in an exposure optical path and adapted to rotate about rotating shafts perpendicular to an optical axis.

11. An apparatus according to claim 8, wherein said exposing means includes means for adjusting an amount of exposure.

12. An apparatus according to claim 8, wherein said exposing means comprises means for illuminating the image and an optical system for splitting a beam from the image illuminated by said illuminating means into split beams and focusing the split beams on said plurality of solid-state image pickup devices 13. An apparatus according to claim 12, wherein said optical system comprises a focusing lens, and a polarizing beam splitter for splitting the beam from said focusing lens.

14. An apparatus according to claim 12, wherein said illuminating means comprises two light sources, two first polarizing plates, arranged in optical paths of beams emitted by said two light sources, for polarizing the beams into beams whose polarization directions are perpendicular to each other, and a polarizing beam splitter for combining the beams passing through said first polarizing plates 15. An apparatus according to claim 14, wherein said illuminating means further comprises second polarizing plates respectively arranged between one of said first polarizing plates and said polarizing beam splitter and between the other of said first polarizing plates and said polarizing beam splitter, and two electrooptical elements respectively arranged between said one of said first polarizing plates and one of said second polarizing plates and between said other of said first polarizing plates and the other of said second polarizing plates, for changing polarization states of transmitted beams.

16. An apparatus according to claim 8, wherein said solid-state image pickup devices respectively comprise charge coupled devices.

17. An apparatus according to claim 8, further comprising means for transferring charges induced by the plural exposures in said solid-state image pickup devices during the plural exposures.

18. A method of converting an image into electrical signals, comprising the steps of:
    exposing a single image on a plurality of solid-state image pickup devices a plurality of times, with exposure positions of the single image on each of the pickup devices being shifted relative to each other for each exposure;
    adding charges induced by the plural exposures in each of the plural pickup devices; and
    performing a filtering operation on output signals from the pickup devices which correspond to pixels to obtain electrical signals representing a filtered image.

19. A method according to claim 18, wherein each exposure is performed with an amount of light corresponding to a weighting coefficient of each pixel when the image is filtered.

20. A method according to claim 18, wherein the solid-state image devices have light-receiving sections which are two-dimensionally arranged, and the image is exposed while being moved two-dimensionally with respect to the solid-state image devices.

21. A method of converting an image into electrical signals, comprising the steps of:
    exposing a single image on a plurality of solid-state image pickup devices a plurality of times each;
    shifting charges induced by exposure cycles and distributed in correspondence with the single image in the solid-state image pickup devices while exposure is performed, and adding shifted charges; and
    performing a filtering operation on output signals from the pickup devices which correspond to pixels to obtain electrical signals representing a filtered image.

22. A method according to claim 21, wherein the charges are transferred in the solid-state image devices during each exposure.

23. A method according to claim 22, wherein each exposure is performed with an amount of light proportional to a weighting coefficient of each pixel when the image is filtered.

24. A method according to claim 22, wherein the solid-state image devices have light-receiving sections which are two-dimensionally arranged, and the charges are transferred two-dimensionally.

25. an apparatus for converting an image into electrical signals, comprising:
   a plurality of solid-state image pickup devices;
   exposing means for exposing a single image on said solid-state image pickup devices a plurality of times each; and
   an electrical circuit for performing a filtering operation on output signals from the pickup devices which correspond to obtain electrical signals representing a filtered image.

26. An apparatus according to claim 25, wherein said exposing means includes image shifting means for changing a relative position between an exposed image and said plurality of solid-state image pickup devices while the image is exposed the plurality of times.

27. An apparatus according to claim 26, wherein said image shifting means comprises transparent parallel flat plates arranged in an exposure optical path and adapted to rotate about rotating shafts perpendicular to an optical axis.

28. An apparatus according to claim 25, wherein said exposing means includes means for adjusting an amount of exposure.

29. An apparatus according to claim 25, wherein said exposing means comprises means for illuminating the image and an optical system for splitting a beam from the image illuminated by said illuminating means into split beams and focusing the split beams on said plurality of solid state image pickup devices.

30. An apparatus according to claim 29, wherein said optical system comprises a focusing lens, and a polarizing beam splitter for splitting the beam from said focusing lens.

31. An apparatus according to claim 29, wherein said illuminating means comprises two light sources, two first polarizing plates, arranged in optical paths of beams emitted by said two light sources, for polarizing the beams into beams whose polarization directions are perpendicular to each other, and a polarizing beam splitter for combining the beams passing through said first polarizing plates.

32. An apparatus according to claim 31, wherein said illuminating means further comprises second polarizing plates respectively arranged between one of said first polarizing plates and said polarizing beam splitter and between the other of said first polarizing plates and said polarizing beam splitter, and two electrooptical elements respectively arranged between said one of said first polarizing plates and one of said second polarizing plates and between said other of said first polarizing plates and the other of said second polarizing plates, for changing polarization states of transmitted beams.

33. An apparatus according to claim 25, wherein said solid-state image pickup devices each comprise charge coupled devices.

34. An apparatus according to claim 25, further comprising means for transferring charges induced by the plural exposures in said solid-state image pickup devices during the plural exposures.

* * * * *